(12) United States Patent
Chao

(10) Patent No.: US 6,904,050 B2
(45) Date of Patent: *Jun. 7, 2005

(54) USER EQUIPMENT WITH BINARY-TREE MULTIPLEXING SCHEDULING

(75) Inventor: Yi-Ju Chao, Huntington Station, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 212 days.

This patent is subject to a terminal disclaimer.

(21) Appl. No.: 10/314,691

(22) Filed: Dec. 9, 2002

(65) Prior Publication Data

US 2003/0118046 A1 Jun. 26, 2003

Related U.S. Application Data

(63) Continuation of application No. 10/010,868, filed on Dec. 7, 2001, now Pat. No. 6,504,848.
(60) Provisional application No. 60/297,807, filed on Jun. 13, 2001.

(51) Int. Cl.$^7$ ................................................. H04J 3/16
(52) U.S. Cl. ........................................ 370/437; 370/537
(58) Field of Search ................................ 370/254, 255, 370/256, 257, 258, 395.31, 395.32, 428, 429, 437, 395.4, 442, 443, 444, 445, 447, 459, 461, 462, 537, 538, 540

(56) References Cited

U.S. PATENT DOCUMENTS

| | | | |
|---|---|---|---|
| 4,593,282 A | | 6/1986 | Acampora et al. |
| 5,463,777 A | * | 10/1995 | Bialkowski et al. ........ 707/102 |
| 5,574,910 A | * | 11/1996 | Bialkowski et al. ........... 707/1 |
| 5,648,958 A | | 7/1997 | Counterman |
| 6,222,851 B1 | | 4/2001 | Petry |
| 6,504,848 B1 | * | 1/2003 | Chao .......................... 370/437 |
| 6,553,002 B1 | * | 4/2003 | Bremer et al. .............. 370/254 |

* cited by examiner

*Primary Examiner*—Kwang Bin Yao
(74) *Attorney, Agent, or Firm*—Volpe & Koenig, P.C.

(57) ABSTRACT

A user equipment (UE) for multiplexed scheduling of information blocks from multiple sources on a single communication channel divided into multiple address positions. The information block from each source has a repetition period and is divided into a number of segments. The UE includes determining the total number of positions on the channel to be scheduled; mapping positions in a non-sequential order corresponding to nodes in a binary tree, whereby each layer of the binary tree corresponds to a repetition period; ordering the blocks by repetition period, starting with the smallest repetition period; assigning information segments of each block to unassigned positions; and marking as assigned all child nodes of the assigned position node in the layer corresponding to the repetition period.

19 Claims, 13 Drawing Sheets

USER EQUIPMENT WITH BINARY-TREE MULTIPLEXING SCHEDULING

CROSS REFERENCE TO RELATED APPLICATIONS

This application is a continuation of U.S. patent application Ser. No. 10/010,868, filed on Dec. 7, 2001 now U.S. pat. No. 6,504,848 and claims priority from Provisional Patent Application No. 60/297,807, filed on Jun. 13, 2001.

FIELD OF INVENTION

The present invention relates to the requirement for multiple blocks of information scheduled periodically to access a physical layer of a single channel. Specifically, the present invention relates to achieving efficient utilization of the physical layer of a single channel and the optimized scheduling access of a single channel.

BACKGROUND

In wireless communication systems, there may be multiple blocks of information from multiple sources required to be scheduled for periodic access of single channel. Due to constraints of the physical layer of the channel, such as limited transmission rate or power level, each block of information may need to be segmented into several segments, with each segment scheduled at a position for accessing the channel.

While scheduling the different sources of information, several requirements must be considered. The single channel is divided into multiple addresses or positions to which information segments are assigned or scheduled. As multiple sources of information have their associated information block segments scheduled along the channel positions, the scheduled information is considered multiplexed onto the channel. Therefore, conflicts of positions between different segments of information must be avoided, i.e., a channel position cannot be shared by segments of two different information blocks. Thus, the first requirement is that each position can be assigned to only one segment of information.

Second, since the repetition period required by each source of information is based on functions associated with the information, the different sources of information require different periods for accessing a single channel. For example, in 3G UMTS, a Broadcast Channel (BCCH) having System Information Blocks (SIBs) with different periods signifies various latency of system functions, such as Power Control or Cell Selection. Shorter repetition periods lead to shorter latency since User Equipment (UE) can receive system information faster than required to perform system functions. However, this requirement compromises efficient use of limited bandwidth of the channel. Shorter repetition periods also imply heavier loading to the single channel and limit the possibility to allocate the bandwidth for other usages.

Third, in order to maximize channel efficiency, unassigned positions on the channel should be kept to a minimum in order to maximize the utilization of the channel.

Fourth, segments of the same block of information should be scheduled as consecutively as possible, since information often cannot be read until all segments of the same source of information arrive at the receiver.

One solution to this problem has been to use a first come first service (FCFS) assignment method. In this method, the scheduler begins scheduling with a first source's block of information. Once the first source of information is scheduled, the scheduler then assigns positions to the block of information of a second source of information on to the single channel. While scheduling the second source of information, the scheduler needs to avoid assigning channel positions that are already assigned to the first source's block of information. Thus, while scheduling the subsequently scheduled blocks of information, the scheduler needs to keep track of all positions that are already assigned to previously scheduled blocks of information.

FIGS. 1A and 1B show an example in which three sources of information are scheduled to access a single channel, CHANNEL A. Three blocks of information, SOURCE 1, SOURCE 2, and SOURCE 3 are shown having varying segment counts and repetition periods. FIG. 1B shows the scheduling of the red, blue and green information segments to positions on CHANNEL A based on the segment counts and required repetition periods of SOURCE 1, SOURCE 2 and SOURCE 3. As evident in CHANNEL A shown in FIG. 1B, there are unassigned positions remaining after the scheduling of the SOURCE 1, SOURCE 2 and SOURCE 3 information blocks (8, 9, 18, 19, 20 . . . ). As more blocks of information with different segment count and repetition period constraints are added for scheduling on CHANNEL A, a scheduling method that does not compromise one or more of the above requirements becomes difficult to achieve.

Using the FCFS approach results in several compromises, such as segments belonging to the same source's block of information cannot be scheduled consecutively since the solution does not reserve enough consecutive positions available that can satisfy information with large segment counts. This compromise is shown in FIG. 1B for SOURCE 3, as the green information segments are not scheduled consecutively on CHANNEL A. This delays the reading of the SOURCE 3 block of information as the receiver awaits for all segments of the information block to arrive. Also, due to the periodic nature of the scheduling, two sources of information may conflict with each other at some future position, thus creating the need to perform global searches each time an information segment is to be assigned to a position in order to avoid the possible conflict.

What is needed is a method and system that determines the required bandwidth for a given set of information blocks and that efficiently schedules information while optimizing for the above requirements.

SUMMARY

The present invention comprises a UE with binary tree multiplexed scheduling of information blocks from multiple sources on a single communication channel divided into multiple address positions. The information block from each source has a repetition period and is divided into a number of segments. Once the total number of positions on the channel to be scheduled are determined, positions are mapped in a non-sequential order corresponding to nodes in a binary tree, whereby each layer of the binary tree corresponds to a particular repetition period. The blocks of information are assigned in the order of ascending repetition period. The information segments of each block are scheduled to unassigned positions at the associated binary tree layer as well as to all corresponding child nodes.

DETAILED DESCRIPTION OF THE PREFERRED EMBODIMENTS

Figures 1A, 1B:
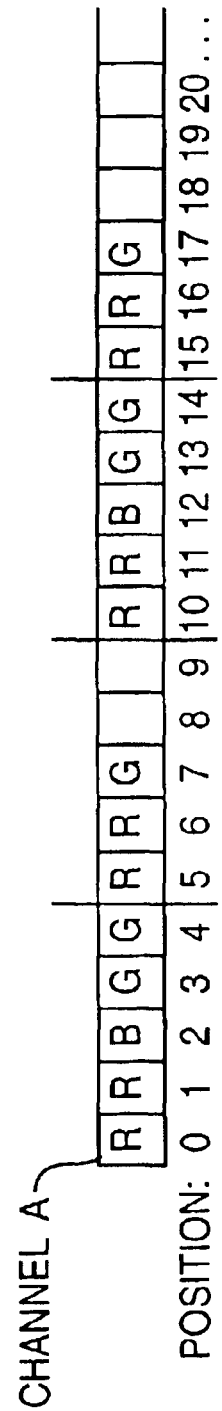
FIGS. 1A and 1B show prior art multiplexing of three different blocks of information onto a single channel.

The present invention will be described with reference to the drawing figures where like numerals represent like elements throughout.

According to the present invention, there are R blocks of information denoted by $INFO_1$, $INFO_2$, ..., $INFO_R$, each associated with a source of information. Each information block INFO has its own repetition period RP, which indicates how often the information should access the single channel, and is divided into segments SEGs with a segment count SC, which is the number of segments SEGs to a block of information. A single channel is divided into address positions P to which information segments SEGs are scheduled or assigned.

The following formula determines whether there is adequate bandwidth for a given set of information sources to be accessed by a single channel.

$$\sum_{r=1}^{R} \frac{INFO_R(sc)}{INFO_r(RP)} \leq 1 \qquad \text{(Equation 1)}$$

Adequate bandwidth exists if Equation 1 holds true.

Figure 2:
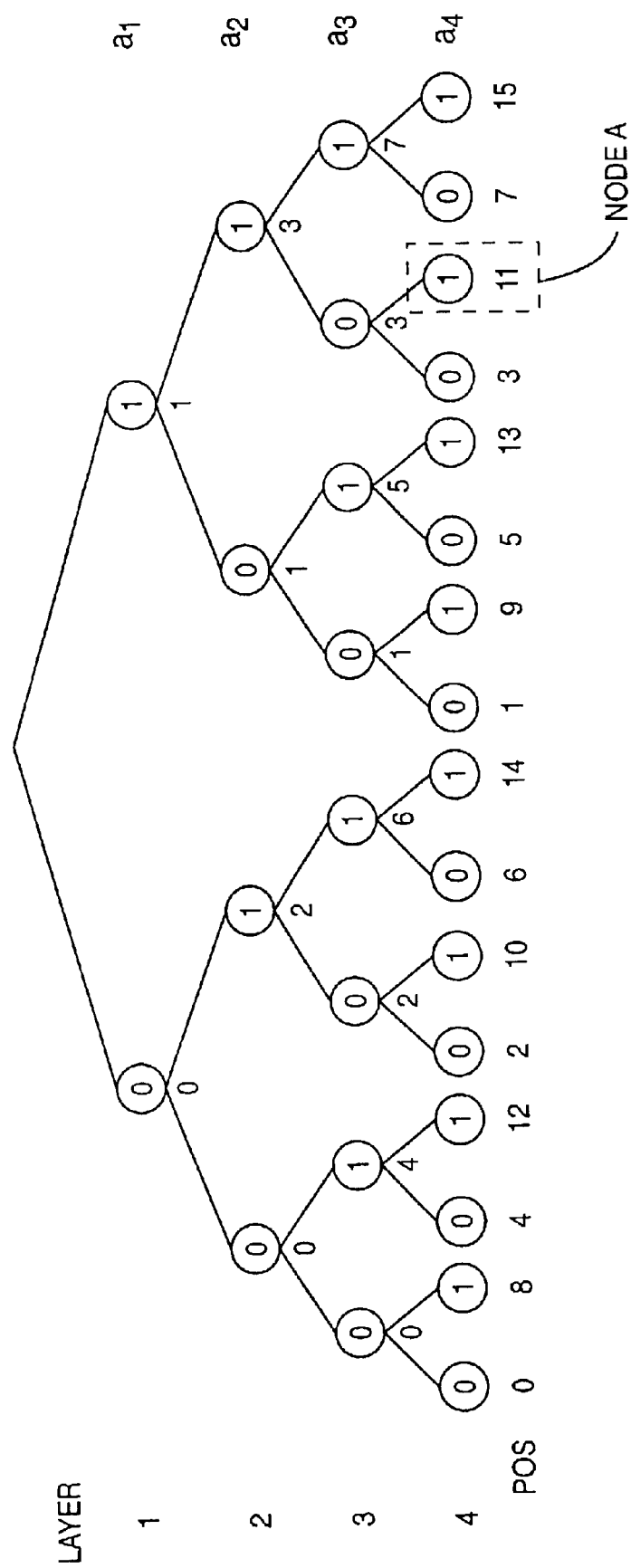
FIG. 2 shows a four layer binary tree.

FIG. 2 shows an example of a binary tree with N layers and $2^N$ positions on the bottom layer. N is chosen such that $2^N$ is the maximum repetition period RP among all of the information blocks INFOs. The repetition period RP usually depends on overall system requirements, and is preferred to be equivalent to $2^N$ for some natural number N. This avoids conflict of different information blocks INFOs at any particular position.

Returning to FIG. 2, each node of the layer n where n N, can be represented as an n-dimension vector ($a_n$, $a_{n-1}$, ..., $a_1$) with arguments 0 or 1. A binary tree is defined such that at each layer, the argument an alternates between 0 and 1 from left to right. Each node of the layer n is associated with a value that is equivalent to the binary representation of the vector. For example, at node A with layer value n=4, a vector ($a_4$, $a_3$, $a_2$, $a_1$) has a binary representation of (1011), which is equivalent to eleven (11). For the binary tree shown in FIG. 2 with four layers (N=4), there are sixteen positions ($2^4$) in the order 0, 8, 4, 12, 2, ... 7, 15, as shown in the bottom row. Each node has an associated parent node and two child nodes.

Figure 3A:
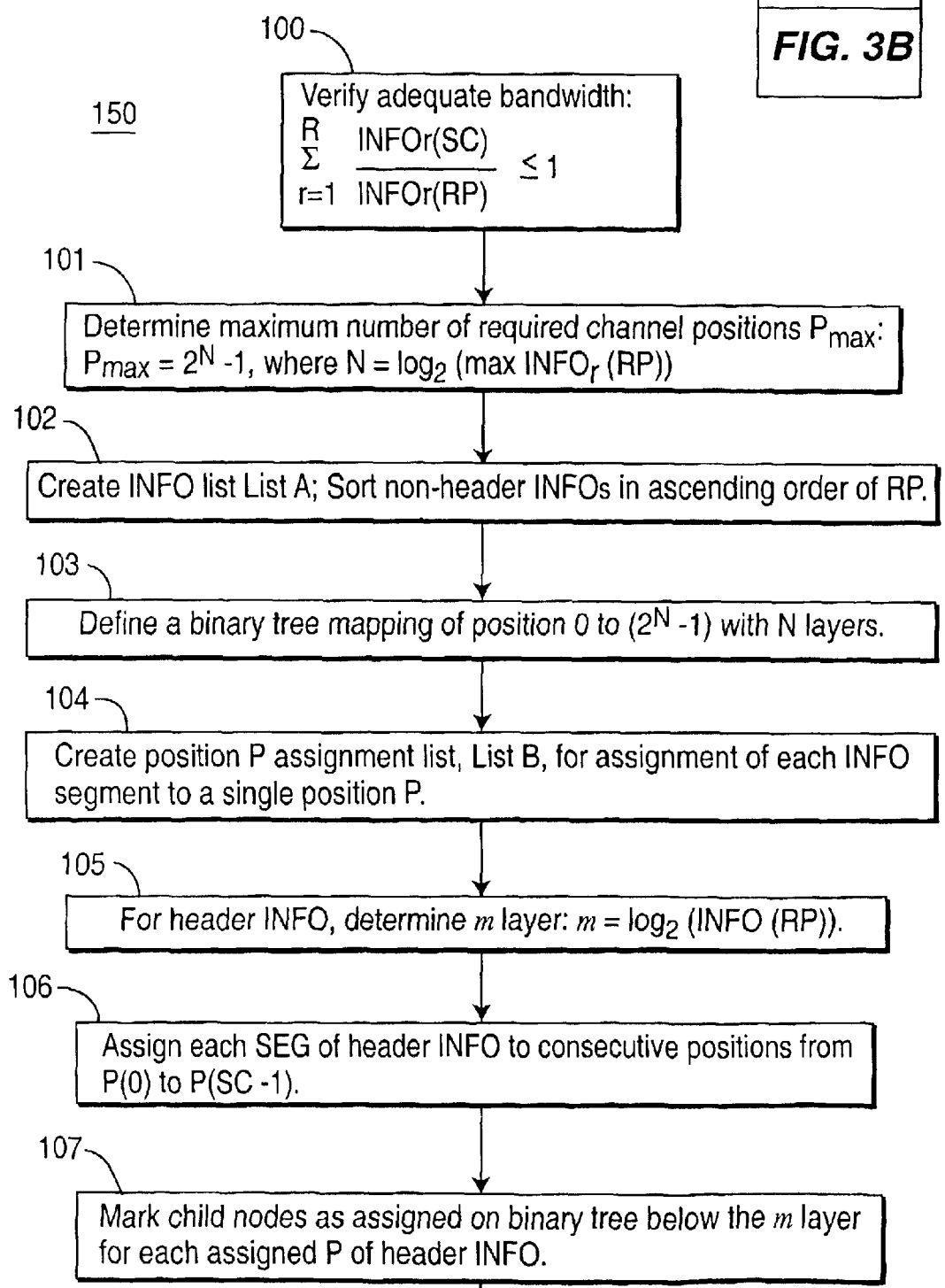
FIGS. 3A and 3B show a method flow diagram for scheduling multiple sources of information on a multiplexed single channel using a binary tree.
Figure 3B:
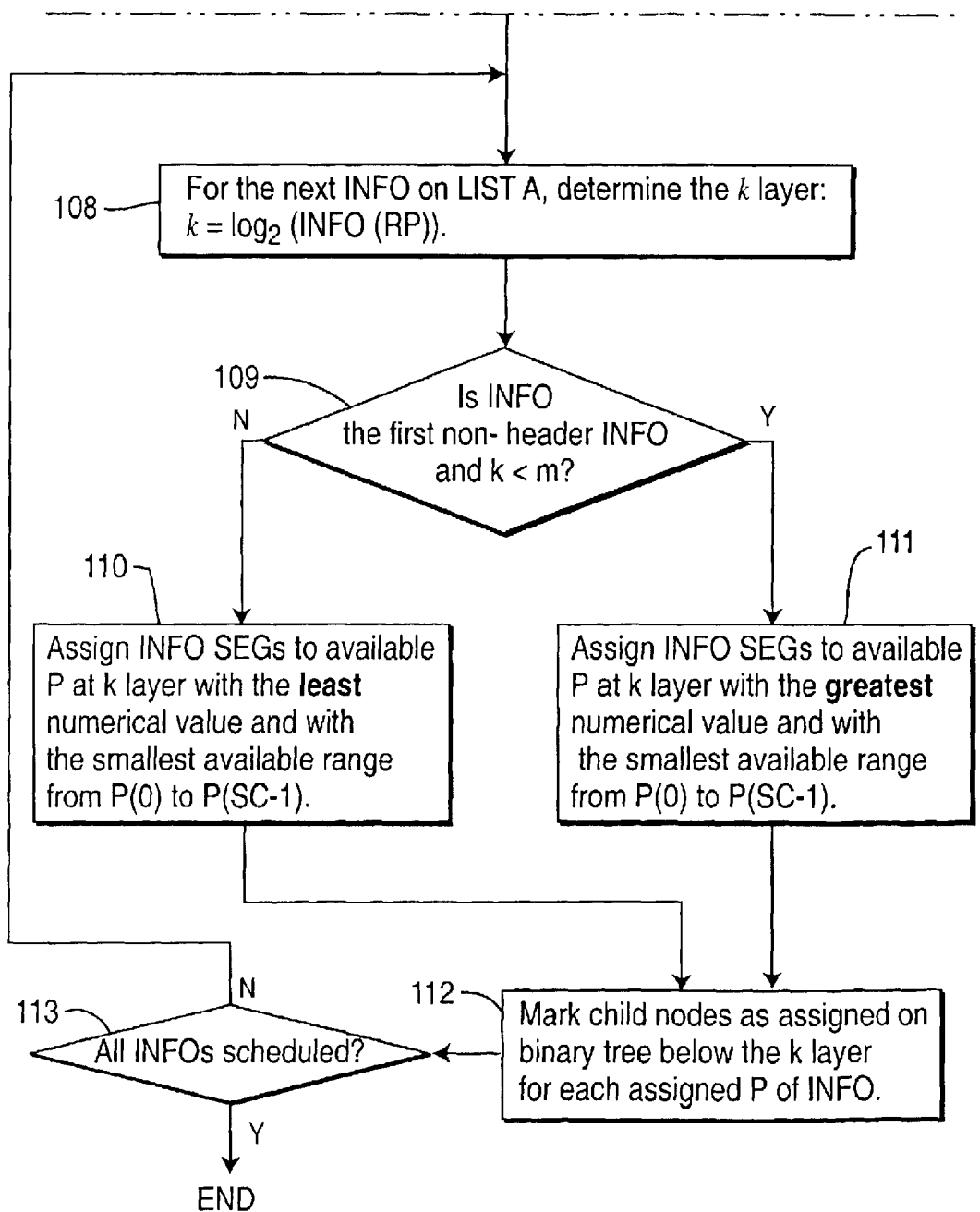

FIG. 3 shows a flow diagram of a method 150 in accordance with the present invention for scheduling multiple blocks of information onto a single communication channel. First, adequate bandwidth is confirmed for the given set of information blocks using Equation 1 (step 100). Next, the scheduler must determine the number of positions necessary to allow all information segments to be scheduled (step 101). $P_{MAX}$ represents the maximum number of positions needed to allow the total number of segments to be scheduled, and is represented as follows:

$$P_{MAX}=2^N-1 \qquad \text{(Equation 2)}$$

where $$N=\log_2(\max INFO_r(RP)) \qquad \text{(Equation 3)}$$

For each information block INFO, positions P(i) for i=(0, 1, ..., SC) are selected from among the positions from P=0 to P=$2^N$-1.

Next, in step 102, an information list, LIST A, is created for all of the information blocks INFOs sorted in ascending order of their repetition periods RP. Some systems might require specific positions for a certain type of information. For instance, when the block of information INFO is control information, such as a management information base (MIB), it is considered to be a header INFO, and is placed on the top of LIST A. When sorting the information blocks INFOs in LIST A, the non-header INFOs are sorted in ascending order of RP, directly below the header INFO in LIST A. The scheduler refers to LIST A for the order in which to assign information segments onto the single channel. Using the format as shown in FIG. 2, a binary tree is created with N layers and 0 to $2^N$-1 positions (step 103). A position assignment list, LIST B, is next created in step 104, where each information segment SEG for each information block INFO is assigned to a single position P. The next step for scheduling, step 105, involves determining which layer of the binary tree is to be used for the first information block $INFO_1$. For layer m, m is defined by Equation 4:

$$m=\log_2(INFO_1(RP)) \leq N \qquad \text{Equation 4}$$

In step 106, positions for the first information block $INFO_1$ are chosen using consecutive numbers from P=0 to P=(SC−1). Nodes on the m layer that represent assigned positions for the first information block $INFO_1$, are virtually marked on the binary tree in step 107. All child nodes below the virtually marked nodes on the m layer are also marked as assigned and are removed from consideration for assigning positions to any segment SEG of the remaining information blocks INFOs. In step 108, the next INFO is retrieved from LIST A. Layer k represents a layer for any subsequently scheduled information block $INFO_r$, and is defined by Equation 5:

$$k=\log_2(INFO_r(RP)) \leq N \qquad \text{Equation 5}$$

Two criteria are examined in step 109 when assigning information segments SEGs of INFO to positions P: 1) whether INFO immediately proceeds the header INFO (i.e., INFO is the first non-header INFO in LIST A); and 2) whether k<m. If both criteria of step 109 are satisfied, then INFO SEGs are assigned in step 111 to available positions P in the k layer having the greatest numerical value and with the smallest possible range among the available positions P from P(0) to P(SC−1). Otherwise, if the step 109 criteria are not satisfied, then INFO SEGs are assigned to positions P on layer k with the least numerical values and the smallest possible range among the available positions P (step 110).

In step 112, all assigned P nodes are virtually marked and, as in step 107, all nodes below the marked P nodes on the k layer are marked as assigned and are removed from consideration for the remaining INFOs. Finally, steps 108 through 112 are repeated until all information blocks INFOs are scheduled (step 113).

Figure 4:
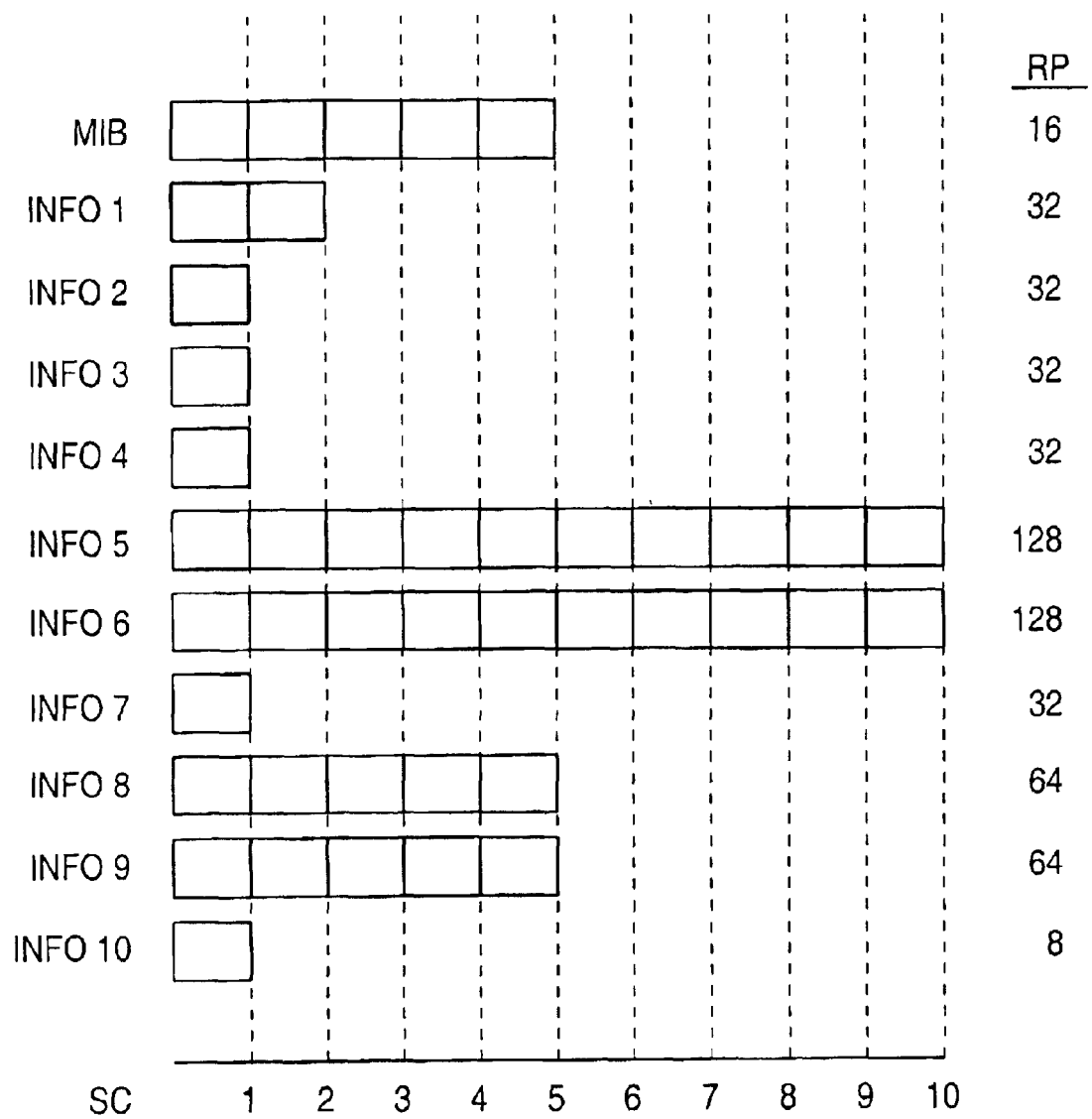
FIG. 4 shows a sample of multiple blocks of information from information sources to be scheduled on a multiplexed single channel.

An example is shown in FIG. 4 having eleven information blocks (MIB, INFO1-INFO10), each with its own segment count SC and repetition period RP. Using Equation 1, a check for adequate bandwidth in step 100 is performed as follows:

$$\frac{5}{16} + \frac{2}{32} + 3\left(\frac{1}{32}\right) + 2\left(\frac{10}{128}\right) + \frac{1}{32} + 2\left(\frac{5}{64}\right) + \frac{1}{8} \leq 1$$

$$0.9375 \leq 1$$

Thus, there is adequate bandwidth and the utilization of the broadcast channel is 93.75%.

The maximum repetition period RP among the eleven information blocks is 128, corresponding with INFO5 and INFO of FIG. 4. Using Equation 3, it follows that N=7. Therefore, positions P for scheduling on the broadcast channel will range between 0 and 127, in accordance with Equation 2 (step 101). The non header blocks INFO1-INFO10 information are then rearranged in ascending order of RP (step 102), as shown in Table 1. Since the management information base MIB is the header INFO and contains control information for the communication system to which the information blocks are received, the first segment of MIB is to be assigned at P=0 so that this information is read first by the receiver. Thus, MIB is in the first row of LIST A in Table 1 regardless that the RP for MIB is not the least among the information blocks.

TABLE 1

LIST A

| Information Block | Segment Count SC | Repetition Period RP | Layer Value |
|---|---|---|---|
| MIB | 5 | 16 | 4 |
| INFO10 | 1 | 8 | 3 |
| INFO1 | 2 | 32 | 5 |
| INFO4 | 1 | 32 | 5 |
| INFO7 | 1 | 32 | 5 |
| INFO3 | 1 | 32 | 5 |
| INFO2 | 1 | 32 | 5 |
| INFO9 | 5 | 64 | 6 |
| INFO8 | 5 | 64 | 6 |
| INFO5 | 10 | 128 | 7 |
| INFO6 | 10 | 128 | 7 |

Figure 5A:
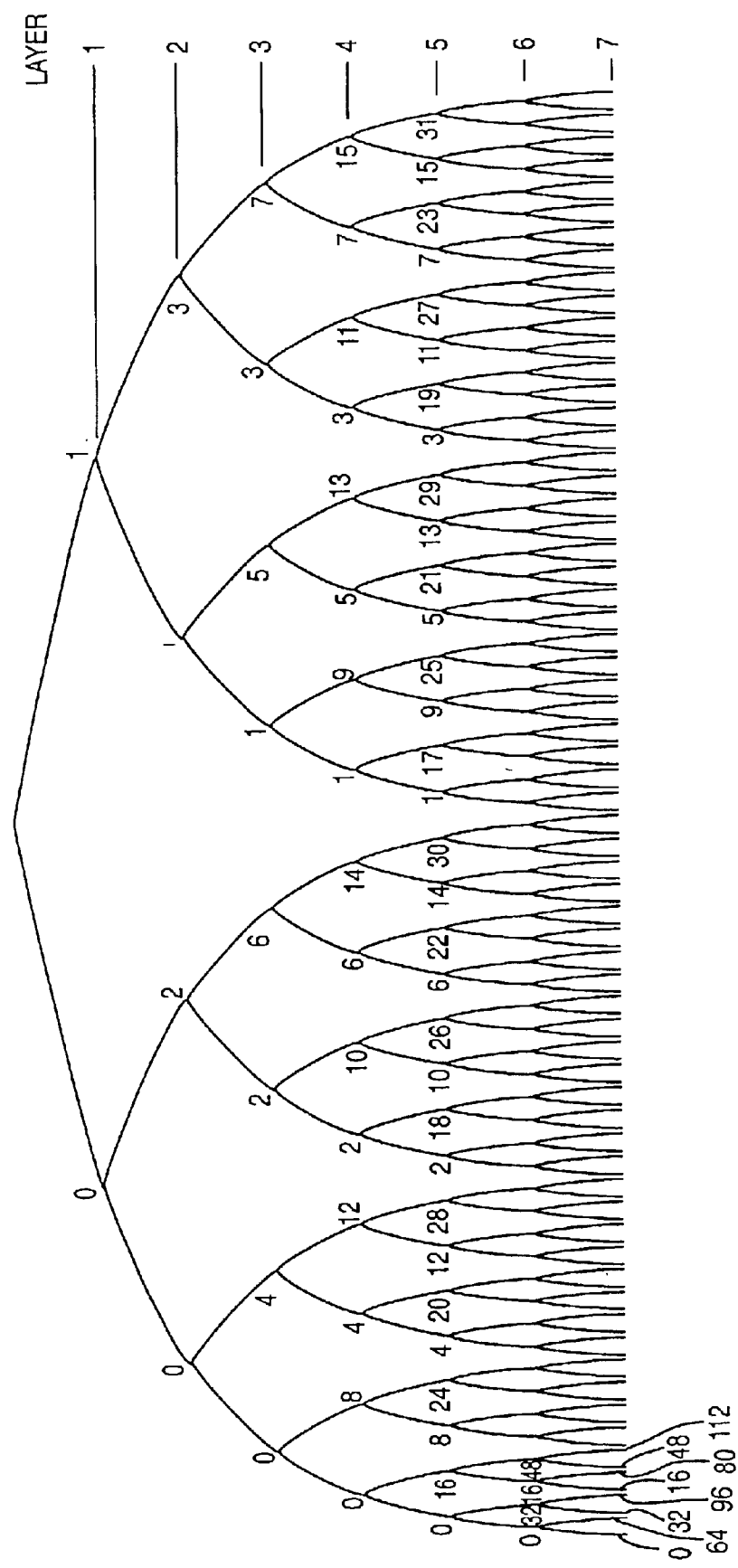
FIGS. 5A through 5H show the progression of mapping the FIG. 4 information blocks to assigned positions onto a binary tree.

With the number layers established as N=7, a binary tree with seven layers and positions from P=0 to P=127 is created (step (103) as shown in FIG. 5A. In order to track the assigned positions P(i) for each information block, LIST B is generated as the position assignment list (step 104). Using Equation 4, the layer value for information block MIB is calculated (step 105):

$$m = \log_2(INFO_1(RP))$$
$$= \log_2(16)$$
$$= 4$$

The five segments of MIB are then assigned (step 106) to consecutive positions P=0, 1,2,3, 4 for positions P(0) to P(4) as shown in Table 2. As each information segment is scheduled for an information block INFO, the corresponding position P is recorded in LIST B.

TABLE 2

LIST B

| Information Block | P(0) | P(1) | P(2) | P(3) | P(4) | P(5) | P(6) | P(7) | P(8) | P(9) | P Range |
|---|---|---|---|---|---|---|---|---|---|---|---|
| MIB | 0 | 1 | 2 | 3 | 4 | | | | | | 5 |
| INFO10 | | | | | | | | | | | |
| INFO1 | | | | | | | | | | | |
| INFO4 | | | | | | | | | | | |
| INFO7 | | | | | | | | | | | |
| INFO3 | | | | | | | | | | | |
| INFO2 | | | | | | | | | | | |
| INFO9 | | | | | | | | | | | |
| INFO8 | | | | | | | | | | | |
| INFO5 | | | | | | | | | | | |
| INFO6 | | | | | | | | | | | |

Figure 5B:
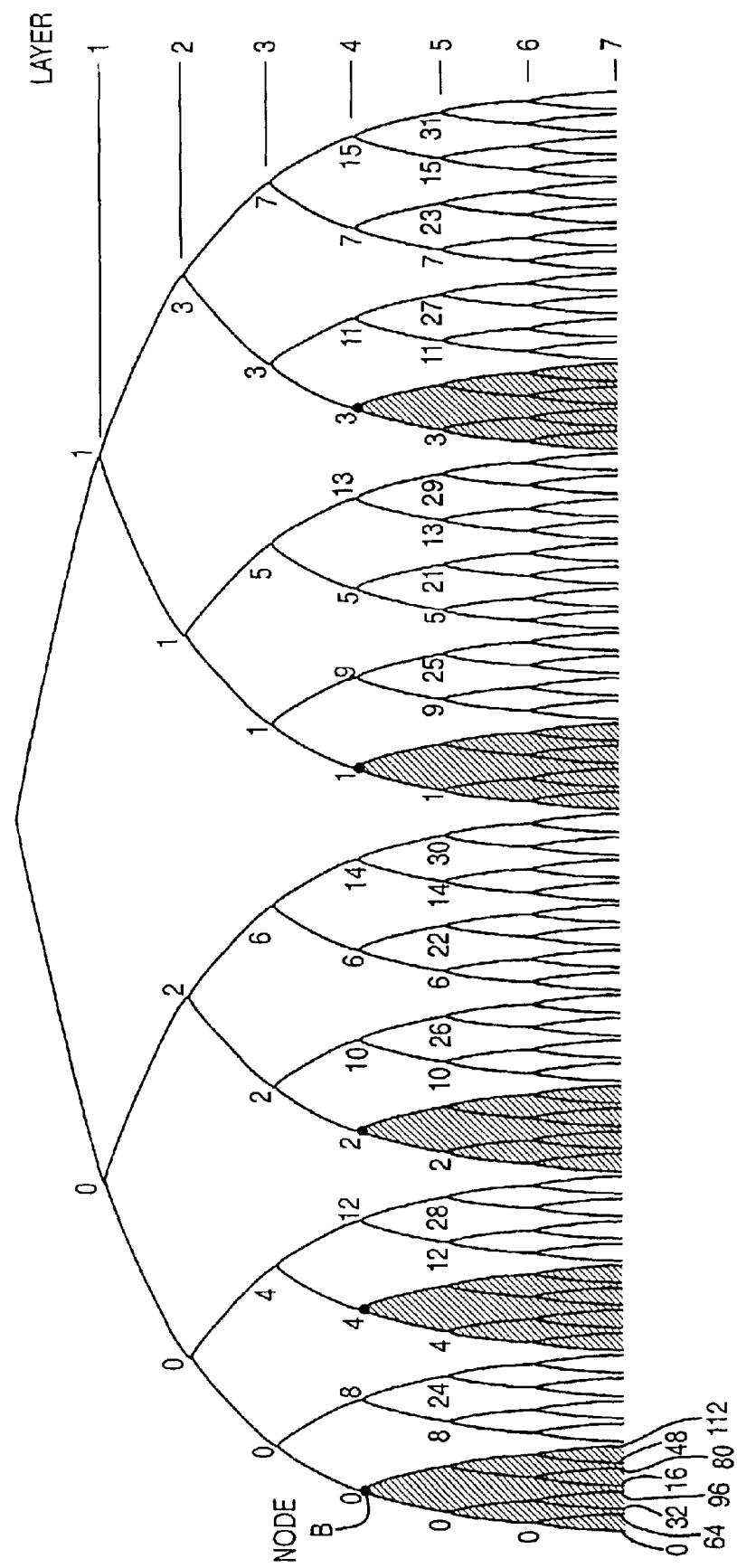

Referring to the binary tree of FIG. 5B, all nodes below layer 4 for P=0, 1, 2, 3 and 4, are eliminated as potentially assignable positions for the remaining segments of information (step 107). For example, at NODE B on layer 4 where P=0, the following nodes are eliminated and will not contain segments of information: the two nodes at layer 5 (P=0, 16), the four nodes at layer 6 (P=0, 32, 16, 48) and the eight nodes at layer 7 (P=0, 64, 32, 96, 16, 80, 48, 112). The shaded area under NODE B in FIG. 5B shows the elimination of these child nodes. Similarly, the child nodes associated with P=1, 2, 3, 4 are marked as assigned, as shown by the shaded areas below layer 4 in FIG. 5B.

Figure 5C:
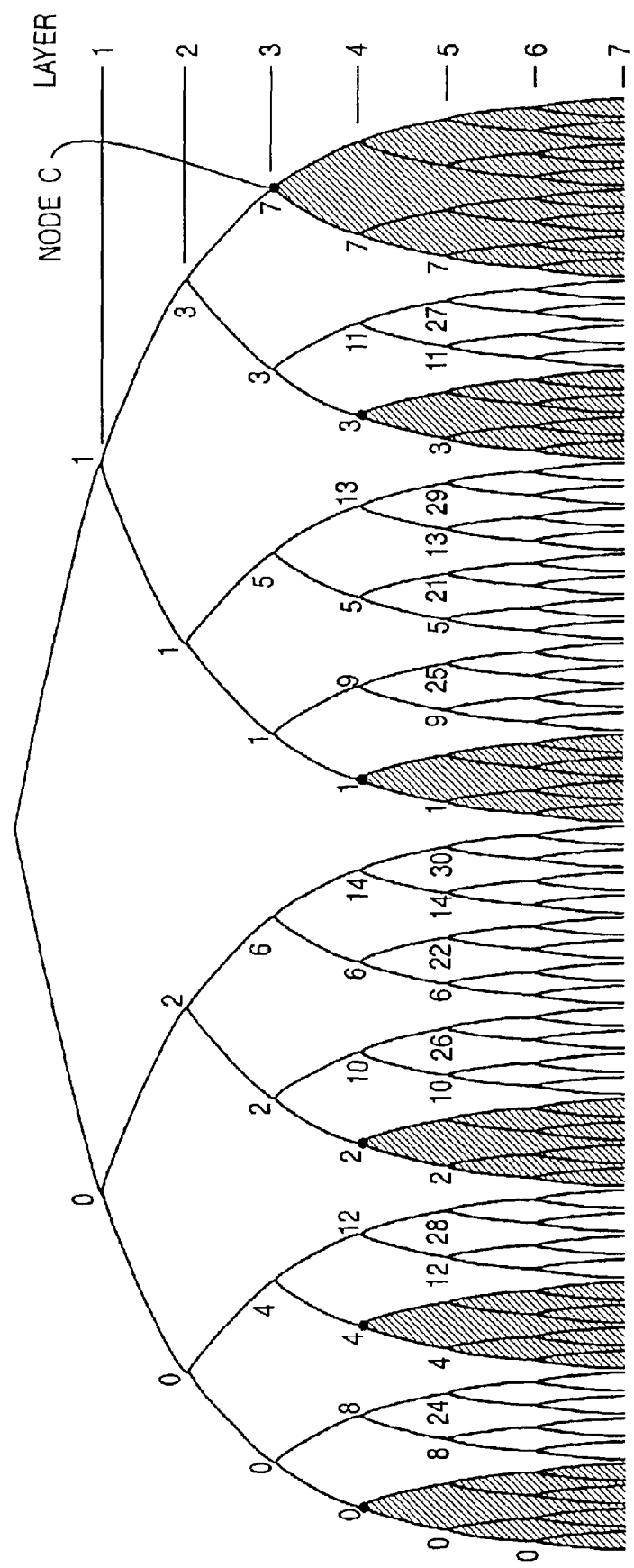

The next block of information to be scheduled is INFO10 since it directly follows MIB in LIST A (step 108). Based on Equation 5, the layer k value for INFO10 is k=3. Looking on the binary tree of FIG. 5B at layer k=3, the possible candidates for selection are P=5, 6 or 7, since P=0 through P=4 were assigned to MIB. The largest of these, position P=7, shown as NODE C in FIG. 5C, is chosen according to steps 109 and 111 since k<m and INFO10 is the first non-header INFO in LIST A. The shaded area under NODE C shows the elimination of all child nodes for P=7 at layer k=3 (step 112).

Figure 5D:
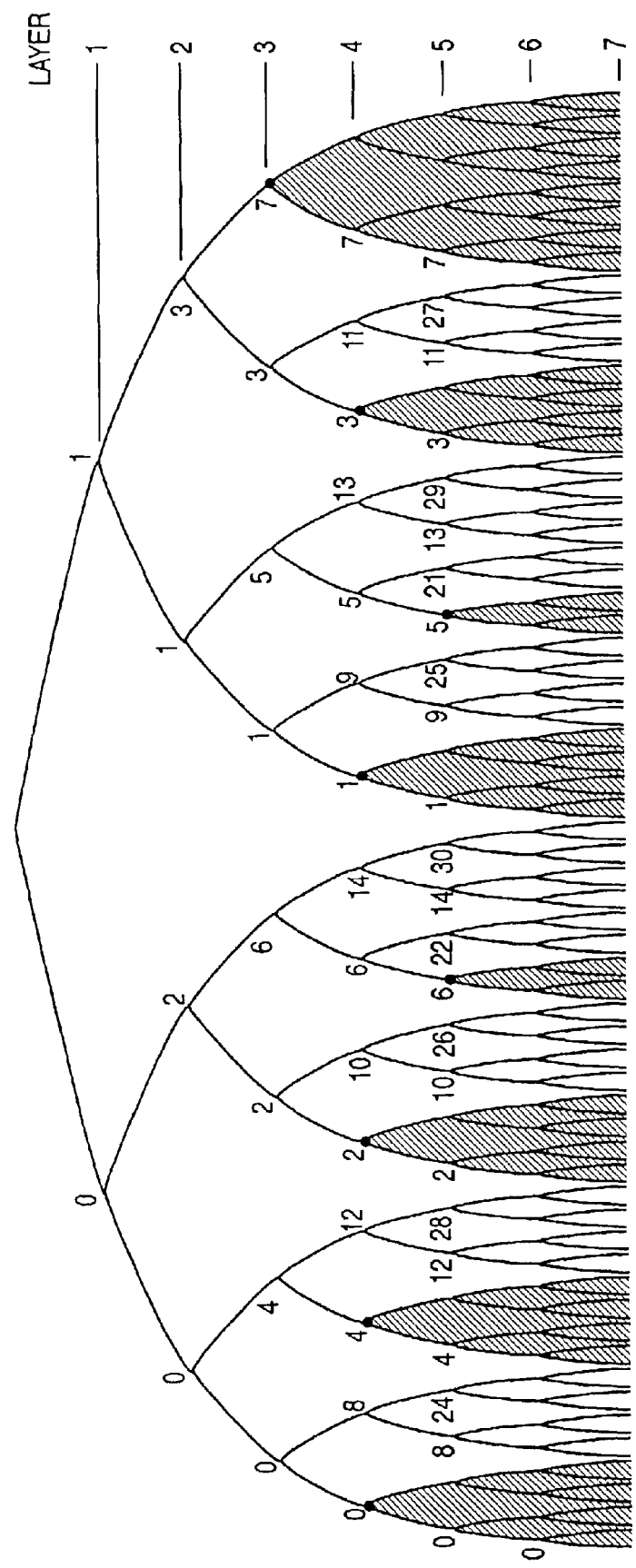

With INFO10 scheduled, LIST A is consulted for the next information block for scheduling. As shown on Table 1, INFO1 is next in line for scheduling. The layer value k=5 associated with INFO1 is calculated from Equation 5 (step 108). Referring to FIG. 5C, the available nodes at layer 5 are those that have not been eliminated by the scheduling of INFO blocks MIB and INFO10. With the first non-header INFO scheduled, all remaining INFOs are scheduled to positions with the least numerical values and as consecutive to one another as possible according to steps 109 and 110. Therefore, the two segments for INFO1 are assigned to positions P=5, 6 as shown in FIG. 5D.

Figure 5E:
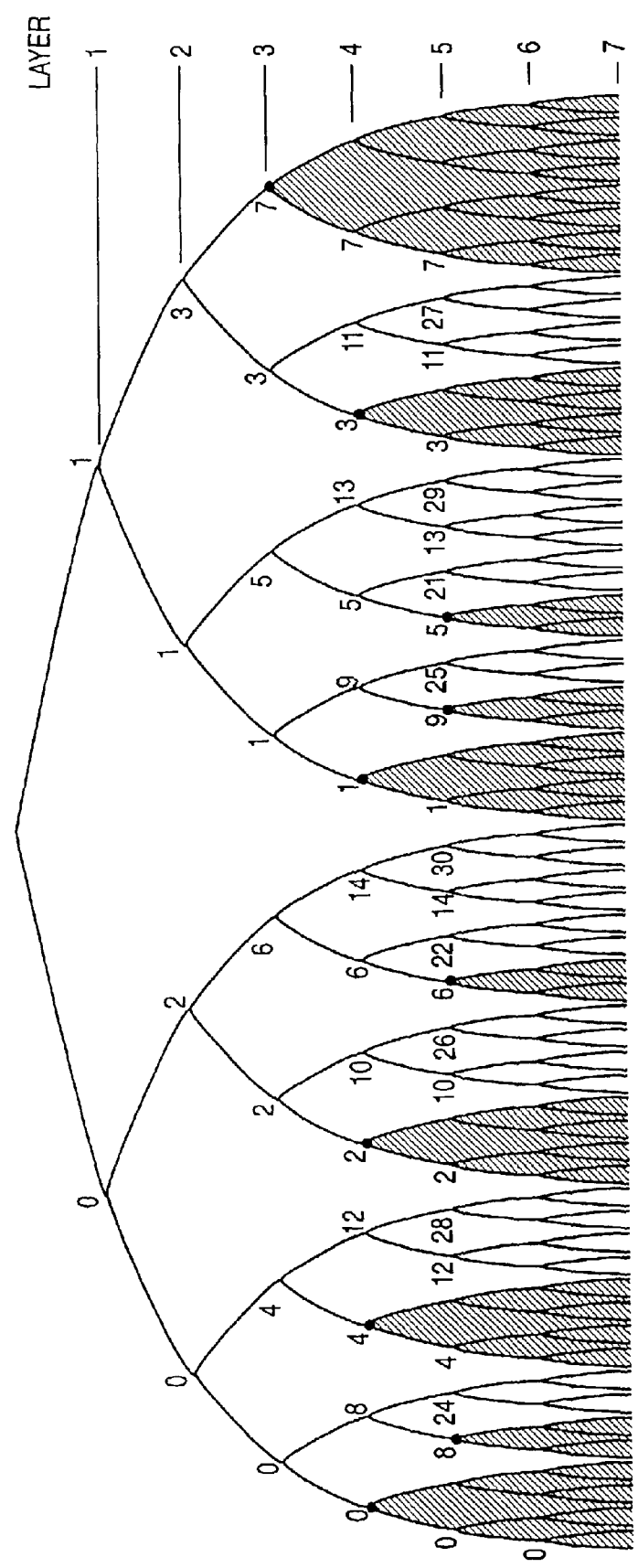

Repeating steps 108,109, 110 and 112, information blocks INFO4 and INFO7 are scheduled next in accordance with the order shown in LIST A. Similar to INFO1, information blocks INFO4 and INFO7 have a layer value of k=5, and thus the next available consecutive positions P=8 and P=9 are assigned to INFO4 and INFO7 respectively. The marking of these positions is shown in FIG. 5E

Figure 5F:
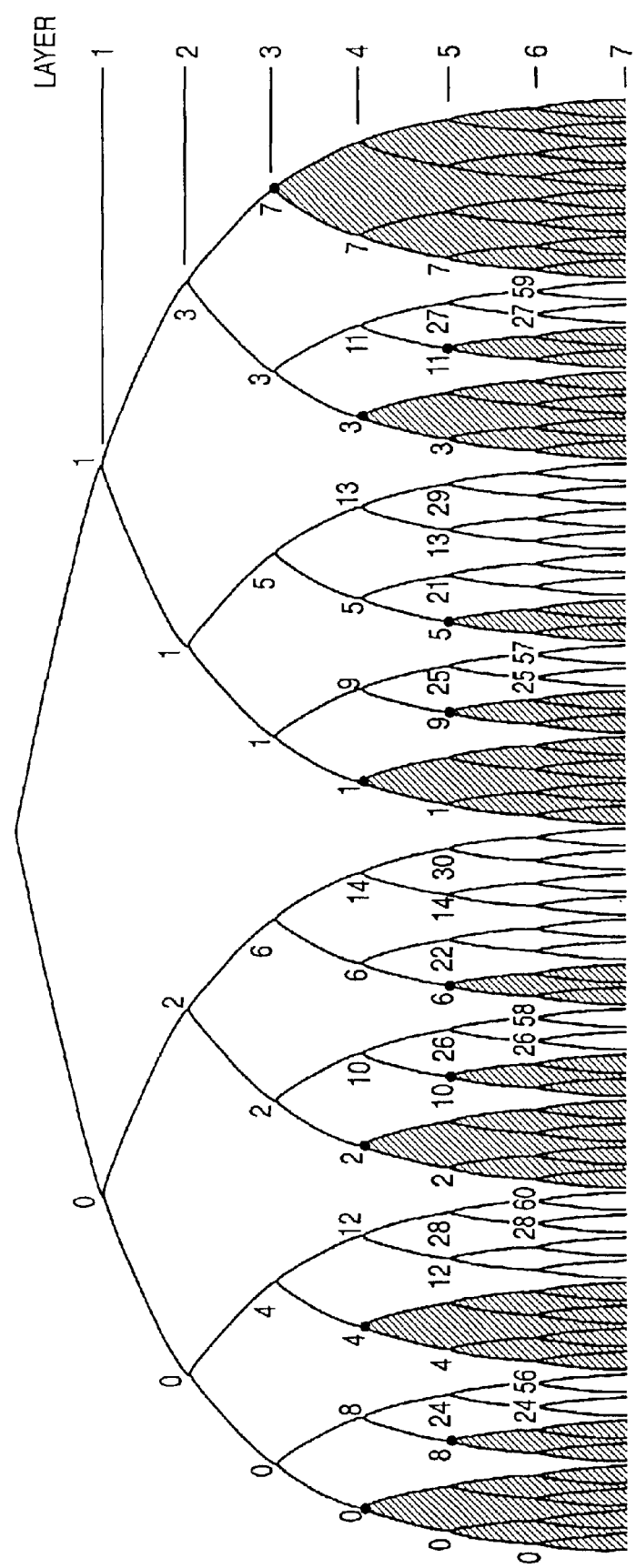

Information blocks INFO2 and INFO3 have identical repetition periods RP of 32 and a layer value of k=5 accordingly. Consulting FIG. 5E, positions P=10, 11 are available at layer 5 and are chosen as shown in FIG. 5F.

Figure 5G:
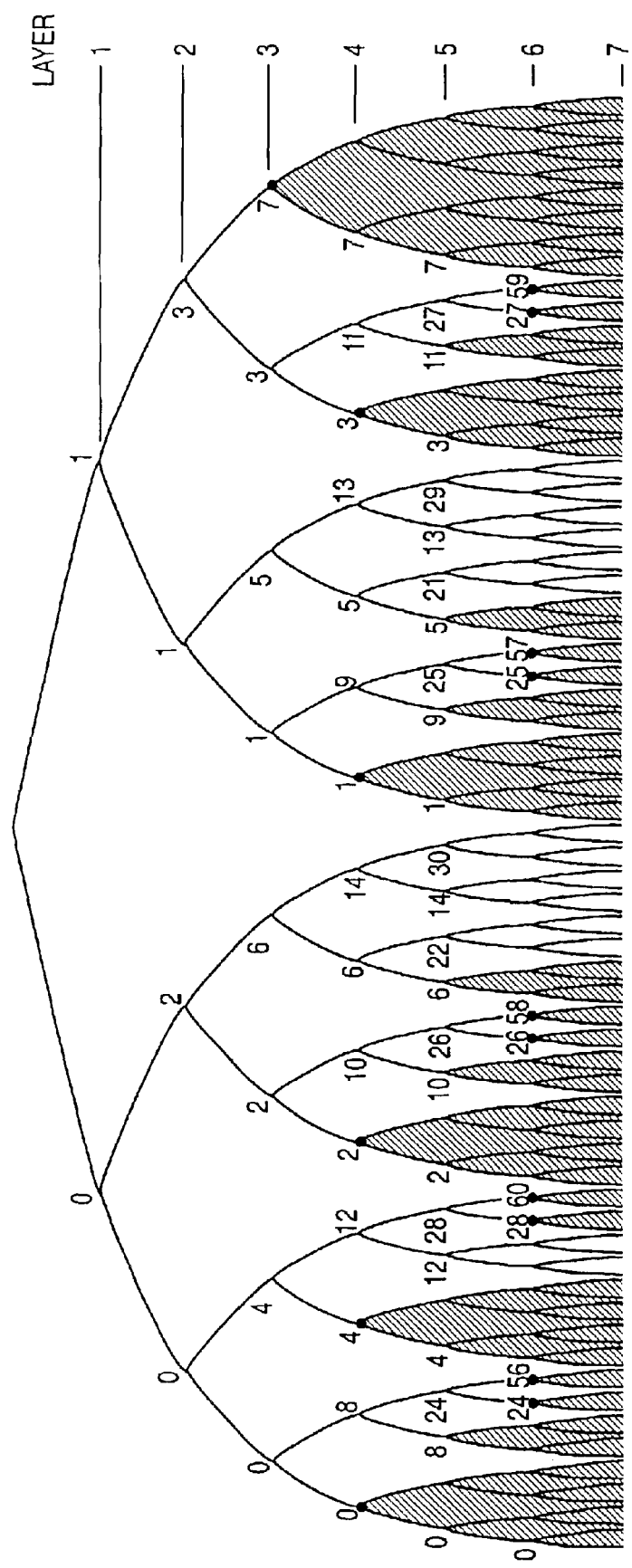
Figure 5H:
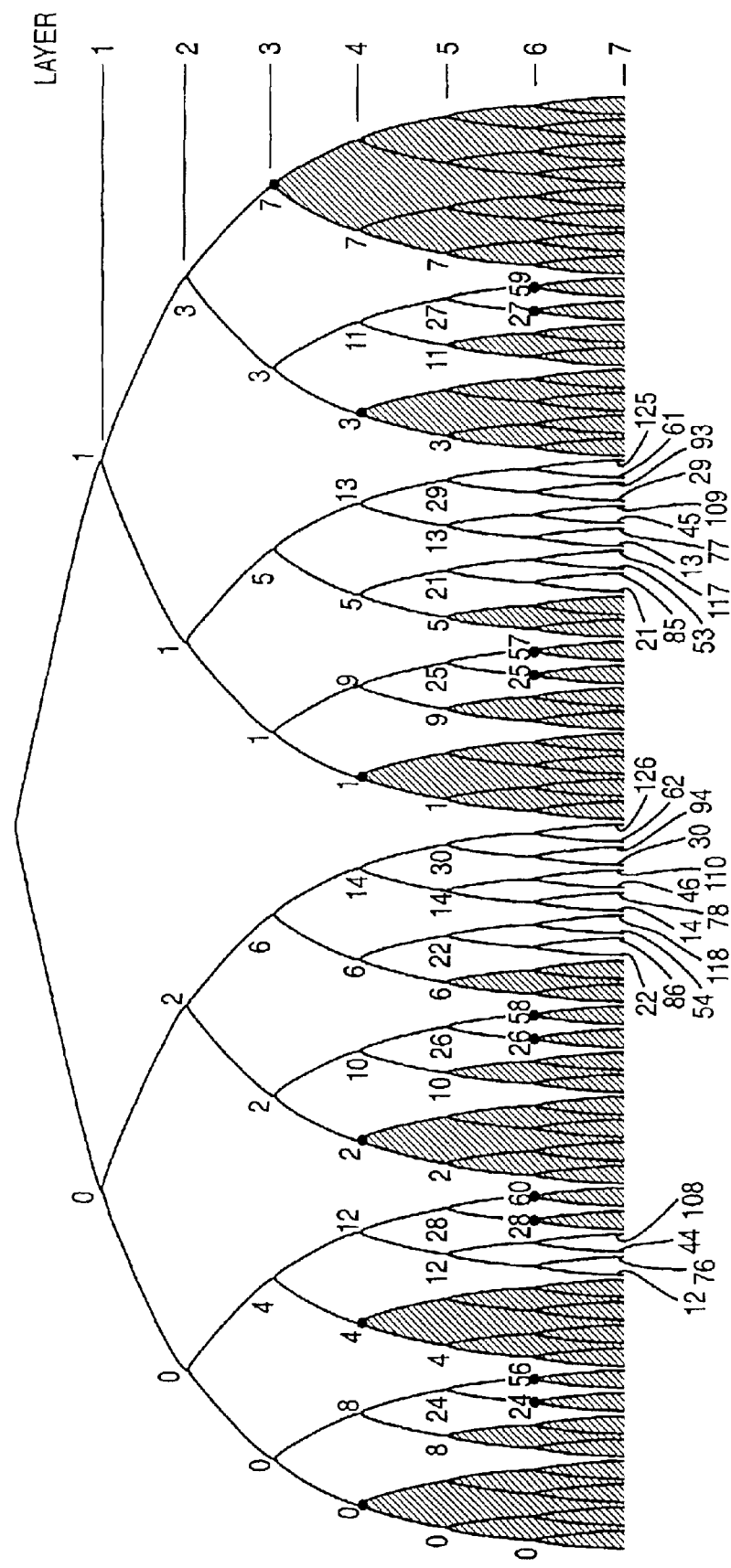

The next information block shown in LIST A for scheduling is INFO9, which has a layer value of k=6. The five information segments of INFO9 are scheduled at the five consecutive positions available at layer 6 with the least numerical values, which are P=24, 25, 26, 27, 28. These positions are recorded in LIST B and the positions that fall below these nodes in layer 7 are eliminated from future consideration as shown in FIG. 5G. Similarly, information block INFO8 has five segments of information and is associated with layer 6. Searching the remaining available positions at layer 6 for five consecutive positions yields P=56, 57, 58, 59, 60. These positions are recorded in LIST B and the corresponding child positions in layer 7 are eliminated from consideration (FIG. 5G) as with the previous information blocks. The remaining information blocks, INFO5 and INFO6, have layer values of k=7 and ten segments of information. Turning to FIG. 5H, ten positions are chosen for INFO5 segments from the remaining available positions at layer 7 which have the smallest range possible: P=12, 13,14, 21, 22, 29, 30,44,45,46. Similarly, INFO6 segments are scheduled to positions that are available at layer 7 and are recorded in LIST B as shown in Table 3, which shows the completed LIST B for system 10.

reflect that information segments are assigned to their respective positions in the corresponding binary tree layer as well as all corresponding child node positions.

It should also be recognized to one skilled in the art that a B-tree or splay tree could similarly be mapped in accordance with the present invention.

What is claimed is:

1. A user equipment (UE) that supports multiplexed scheduling of information blocks from multiple sources on a single communication channel divided into multiple address positions, the information block from each source having a repetition period and a number of segments, comprising:

a processor for determining the total number of positions on the channel to be scheduled; non-sequential mapping of channel positions in an order corresponding to a binary tree; and assigning information segments of each block to unassigned channel positions corresponding to binary tree nodes of a layer on the binary tree associated with the repetition period of the block and also marking as assigned all corresponding child nodes of the associated assigned layer nodes; and a memory for storing the binary tree mapping.

2. The UE of claim 1 wherein the determining of the total number of positions is a function of the repetition period of the information.

3. The UE of claim 1 wherein the number of layers in the binary tree is a function of the greatest repetition period of the information blocks.

4. The UE of claim 1 wherein the processor further determines the priority order of information blocks for assigning positions on the channel based on the repetition period and assigns information segments of each informa-

TABLE 3

| Information Block | P(0) | P(1) | P(2) | P(3) | P(4) | P(5) | P(6) | P(7) | P(8) | P(9) | P Range |
|---|---|---|---|---|---|---|---|---|---|---|---|
| MIB | 0 | 1 | 2 | 3 | 4 | | | | | | 5 |
| INFO10 | 7 | | | | | | | | | | 1 |
| INFO1 | 5 | 6 | | | | | | | | | 2 |
| INFO4 | 8 | | | | | | | | | | 1 |
| INFO7 | 9 | | | | | | | | | | 1 |
| INFO3 | 10 | | | | | | | | | | 1 |
| INFO2 | 11 | | | | | | | | | | 1 |
| INFO9 | 24 | 25 | 26 | 27 | 28 | | | | | | 5 |
| INFO8 | 56 | 57 | 58 | 59 | 60 | | | | | | 5 |
| INFO5 | 12 | 13 | 14 | 21 | 22 | 29 | 30 | 44 | 45 | 46 | 34 |
| INFO6 | 76 | 77 | 78 | 85 | 86 | 93 | 94 | 108 | 109 | 110 | 34 |

The last column of Table 3 shows the P range for each information block. For information blocks INFO5 and INFO6 with ten segments of information each, the range of position values is 34. This shows that out of 128 positions, the complete set of information segments for INFO5 and INFO6 is received optimized, as the segments are assigned to a group of positions that are relatively compact along the single channel. Thus, the receiver can read INFO5 and INFO6 more quickly and efficiently than if their information segments had been spread over a greater range along the 128 available positions. All other information blocks INFOs have a P range exactly equivalent to the segment count SC, which is the maximum possible efficiency.

To one skilled in the art, it would be evident that the method of the present invention can be implemented by a microprocessor with memory. The binary tree mapping can reside in memory. As segments of information are scheduled, the microprocessor updates the mapping to tion source to channel positions according to the priority order, whereby each information source is assigned completely before information segments of the next information block are assigned.

5. The UE of claim 4, wherein the information blocks include a header block of information which is first in the priority order and the processor further assigns segments of the header information block to numerically consecutive initial channel positions.

6. The UE of claim 5, wherein the processor further assigns segments of subsequent blocks of information to unassigned positions with the least numerical values and as consecutively as possible.

7. The UE of claim 5, wherein the processor further assigns segments of subsequent blocks of information to unassigned positions with the greatest numerical values and as consecutively as possible.

8. A UE for scheduling of information blocks from multiple sources on a single communication channel divided into multiple address positions, the information block from each source having a repetition period and a number of segments, comprising:

a processor for determining the total number of positions on the channel to be scheduled; assigning the blocks in the order of repetition period, starting with the block having the smallest repetition period; whereby the segments of each block are assigned to unassigned positions mapped to nodes in a binary tree; and a memory for storing the binary tree.

9. The UE of claim 8, wherein the information blocks include a header block of information which is first in the priority order and the processor assigns segments of the header information block to numerically consecutive initial channel positions.

10. The UE of claim 9, wherein the processor assigns segments of subsequent blocks of information to unassigned positions with the least numerical values and as consecutively as possible.

11. The UE of claim 9, wherein the processor assigns segments of subsequent blocks of information to unassigned positions with the greatest numerical values and as consecutively as possible.

12. A UE for scheduling information blocks from multiple sources on a single communication channel divided into multiple address positions, the information block from each source having a repetition period and a number of segments, comprising:

a processor for determining the total number of positions on the channel to be scheduled; mapping positions in a non-sequential order corresponding to nodes in a binary tree, whereby each layer of the binary tree corresponds to a repetition period; ordering the blocks by repetition period, starting with the smallest repetition period; assigning, based upon said ordering, information segments of each block to unassigned positions; and identifying and marking as assigned all child nodes of the node in the layer corresponding to the repetition period; and a memory for storing the binary tree.

13. The UE of claim 12, wherein the information blocks include a header block of information which is first in the priority order and the processor assigns segments of the header information block to numerically consecutive initial channel positions.

14. The UE of claim 13, wherein the processor assigns segments of subsequent blocks of information to unassigned positions with the least numerical values and as consecutively as possible.

15. The UE of claim 13, wherein the processor assigns segments of subsequent blocks of information to unassigned positions with the greatest numerical values and as consecutively as possible.

16. A UE for scheduling information blocks from multiple sources on a single communication channel divided into multiple address positions, the information block from each source having a repetition period and a number of segments, comprising:

a processor for determining the total number of positions on the channel to be scheduled; mapping positions in a non-sequential order corresponding to nodes in a binary tree, the binary tree having a plurality of layers, each layer corresponding to a repetition period and the bottom layer having said required number of positions; and assigning information segments of each block to unassigned positions at the layer corresponding with the repetition period of the block and to all corresponding child nodes down to the bottom layer on the binary tree; and a memory for storing the binary tree.

17. The UE of claim 16, wherein the information blocks include a header block of information which is first in the priority order and the processor assigns segments of the header information block to numerically consecutive initial channel positions.

18. The UE of claim 17, wherein the processor assigns segments of subsequent blocks of information to unassigned positions with the least numerical values and as consecutively as possible.

19. The UE of claim 17, wherein the processor assigns segments of subsequent blocks of information to unassigned positions with the greatest numerical values and as consecutively as possible.

* * * * *

UNITED STATES PATENT AND TRADEMARK OFFICE
CERTIFICATE OF CORRECTION

PATENT NO. : 6,904,050 B2
DATED : June 7, 2005
INVENTOR(S) : Yi-Ju Chao

It is certified that error appears in the above-identified patent and that said Letters Patent is hereby corrected as shown below:

Column 3,
Line 37, after the word "where", delete "n N," and insert therefor -- $n \leq N$ --.
Line 40, after the word "argument", delete "an" and insert therefor -- $a_n$ --.

Column 5,
Line 13, before the word "of", delete "INFO" and insert therefor -- INFO6 --.
Line 15, after the word "between", delete "0 and" and insert therefor -- 0 and --.

Signed and Sealed this

Sixth Day of September, 2005

JON W. DUDAS
*Director of the United States Patent and Trademark Office*